(12) United States Patent
Jing et al.

(10) Patent No.: US 10,419,608 B2
(45) Date of Patent: Sep. 17, 2019

(54) CALL FORWARDING METHOD, TERMINAL, AND PORTABLE ELECTRONIC DEVICE

(71) Applicant: Huawei Technologies Co., Ltd., Shenzhen (CN)

(72) Inventors: Hao Jing, Shenzhen (CN); Wenmei Gao, Beijing (CN); Chao Qin, Beijing (CN); Guangyuan Gao, Beijing (CN); Qiang Tao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/549,937

(22) PCT Filed: Feb. 9, 2015

(86) PCT No.: PCT/CN2015/072522
§ 371 (c)(1),
(2) Date: Aug. 9, 2017

(87) PCT Pub. No.: WO2016/127286
PCT Pub. Date: Aug. 18, 2016

(65) Prior Publication Data
US 2018/0034962 A1 Feb. 1, 2018

(51) Int. Cl.
*H04M 3/436* (2006.01)
*H04M 19/04* (2006.01)
(Continued)

(52) U.S. Cl.
CPC .......... *H04M 3/436* (2013.01); *H04M 1/006* (2013.01); *H04M 1/663* (2013.01); *H04M 3/42059* (2013.01); *H04M 3/543* (2013.01); *H04M 19/04* (2013.01)

(58) Field of Classification Search
CPC .... H04M 3/436; H04M 3/54; H04M 3/42059; H04M 1/663; H04M 1/006; H04M 3/543; H04W 4/16
See application file for complete search history.

(56) References Cited

U.S. PATENT DOCUMENTS

| 6,853,717 B1 | 2/2005 | Frentz et al. |
| 2005/0018833 A1 | 1/2005 | Wang et al. |

(Continued)

FOREIGN PATENT DOCUMENTS

| CN | 101052177 A | 10/2007 |
| CN | 102143461 A | 8/2011 |

(Continued)

OTHER PUBLICATIONS

Machine Translation and Abstract of Chinese Publication No. CN103167500, Jun. 19, 2013, 48 pages.
(Continued)

*Primary Examiner* — Margaret G Mastrodonato
(74) *Attorney, Agent, or Firm* — Conley Rose, P.C.

(57) ABSTRACT

A call forwarding method, a terminal, and a portable electronic device, where the method includes determining whether the phone number is in a preset blacklist when a terminal receives a call carrying a phone number, and executing, by the terminal, a preset first call forwarding policy when the blacklist includes the phone number, where the first call forwarding policy includes that the terminal blocks or terminates the call, and does not trigger a server to forward the call to another terminal preset, or executing, by the terminal, a preset second call forwarding policy when the blacklist does not include the phone number, where the terminal presets a call forwarding on busy service or an unconditional call forwarding service.

8 Claims, 4 Drawing Sheets

(51) Int. Cl.
*H04M 3/42* (2006.01)
*H04M 3/54* (2006.01)
*H04M 1/00* (2006.01)
*H04M 1/663* (2006.01)

(56) References Cited

U.S. PATENT DOCUMENTS

| | | | |
|---|---|---|---|
| 2006/0135132 A1 | 6/2006 | Cai et al. | |
| 2007/0021150 A1* | 1/2007 | Noh | H04M 1/006 455/558 |
| 2007/0160186 A1 | 7/2007 | Wang | |
| 2009/0296694 A1 | 12/2009 | Kalyanpur et al. | |
| 2010/0075647 A1* | 3/2010 | Carlson | H04W 76/04 455/417 |
| 2011/0283349 A1* | 11/2011 | Wu | H04M 1/663 726/11 |
| 2014/0128047 A1* | 5/2014 | Edwards | H04L 51/12 455/415 |

FOREIGN PATENT DOCUMENTS

| | | |
|---|---|---|
| CN | 103167500 A | 6/2013 |
| JP | 2002009889 A | 1/2002 |
| JP | 2008252802 A | 10/2008 |
| JP | 2010251826 A | 11/2010 |
| KR | 20060071359 A | 6/2006 |
| KR | 20070020303 | 2/2007 |

OTHER PUBLICATIONS

Machine Translation and Abstract of Chinese Publication No. CN101052177, Oct. 10, 2007, 9 pages.
"360 mobile phone harassment guards intercept "space" and "stop" turned off principle and the number of parking space," Aihua Website, Nov. 3, 2017, 3 pages.
Foreign Communication From a Counterpart Application, PCT Application No. PCT/CN2015/072522, English Translation of International Search Report dated Jun. 26, 2015, 2 pages.
Foreign Communication From a Counterpart Application, PCT Application No. PCT/CN2015/072522, English Translation of Written Opinion dated Jun. 26, 2015, 7 pages.
Machine Translation and Abstract of Chinese Publication No. CN102143461, Aug. 3, 2011, 18 pages.
Foreign Communication From a Counterpart Application, European Application No. 15881448.3, Extended European Search Report dated Jan. 9, 2018, 7 pages.
Foreign Communication From a Counterpart Application, Chinese Application No. 201580002241.2, Chinese Office Action dated Jun. 25, 2018, 8 pages.
Machine Translation and Abstract of Japanese Publication No. JP2002009889, Jan. 11, 2002, 15 pages.
Machine Translation and Abstract of Japanese Publication No. JP2008252802, Oct. 16, 2008, 17 pages.
Machine Translation and Abstract of Japanese Publication No. JP2010251826, Nov. 4, 2010, 24 pages.
Foreign Communication From a Counterpart Application, Japanese Application No. 2017-541785, Japanese Notice of Reasons for Rejections dated Nov. 13, 2018, 1 page.
Foreign Communication From a Counterpart Application, Japanese Application No. 2017-541785, English Translation Japanese Notice of Reasons for Rejections dated Nov. 13, 2018, 2 pages.
Foreign Communication From a Counterpart Application, Korean Application No. 2019-012891917, Korean Notice of Allowance dated Feb. 21, 2019, 3 pages.

* cited by examiner

CALL FORWARDING METHOD, TERMINAL, AND PORTABLE ELECTRONIC DEVICE

CROSS REFERENCE TO RELATED APPLICATION

This application is a U.S. National Stage of International Patent Application No. PCT/CN2015/072522 filed on Feb. 9, 2015, which is hereby incorporated by reference in its entirety.

TECHNICAL FIELD

The present disclosure relates to the field of communications technologies, and in particular, to a call forwarding method, a terminal, and a portable electronic device.

BACKGROUND

Call forwarding is a communication service. If a terminal of a user cannot answer a call or the user is unwilling to answer a call, the incoming call may be forwarded to another terminal that is preset.

Currently, the call forwarding mainly has the following four forwarding modes: unconditional call forwarding (that is, all-incoming-call forwarding), call forwarding on busy (also referred to as forwarding on engaged), call forwarding on no answer, and call forwarding if out of reach.

When a terminal, in which incoming call interception (blacklist principle) is set, receives a call request carrying a phone number, the terminal compares the phone number with phone numbers in a saved blacklist. If the phone number is in the blacklist, the terminal rejects the call request.

When a terminal, in which incoming call interception and call forwarding are set, receives a call request carrying a phone number that is not in a blacklist, when a requirement of call forwarding is satisfied, a server forwards the call to another terminal that is preset.

When a terminal, in which incoming call interception and call forwarding are set, receives a call request carrying a phone number that is in a blacklist, if a type of call forwarding is either "unconditional call forwarding" or "call forwarding on busy," a problem that an incoming call interception fails may occur, that is, the call request carrying the phone number that is in the blacklist is forwarded to another terminal that is preset, causing interference for a user.

SUMMARY

Embodiments of the present disclosure provide a call forwarding method, a terminal, and a portable electronic device such that a failure of incoming call interception is avoided when a terminal sets unconditional call forwarding or call forwarding on busy.

A first aspect of the embodiments of the present disclosure provides a call forwarding method, including determining whether the phone number is in a preset blacklist when a terminal receives a call carrying a phone number, and executing, by the terminal, a preset first call forwarding policy if the blacklist includes the phone number, where the first call forwarding policy includes that the terminal blocks or terminates the call, and does not trigger a server to forward the call to another terminal that is preset, or executing, by the terminal, a preset second call forwarding policy if the blacklist does not include the phone number, where the terminal presets a call forwarding on busy service or an unconditional call forwarding service.

With reference to the first aspect of the embodiments of the present disclosure, in a first implementation manner of the first aspect of the embodiments of the present disclosure, when the terminal presets the call forwarding on busy service, executing, by the terminal, a preset first call forwarding policy includes disabling, by the terminal, the call forwarding on busy service, sending, by the terminal, a hang-up instruction to the server, and enabling, by the terminal, the call forwarding on busy service after the call is terminated, and executing, by the terminal, a preset second call forwarding policy includes executing, by the terminal, a preset call forwarding policy corresponding to the call forwarding on busy service.

With reference to the first aspect of the embodiments of the present disclosure, in a second implementation manner of the first aspect of the embodiments of the present disclosure, when the terminal presets the call forwarding on busy service, executing, by the terminal, a preset first call forwarding policy includes blocking, by the terminal, the call, and executing, by the terminal, a preset second call forwarding policy includes executing, by the terminal, a preset call forwarding policy corresponding to the call forwarding on busy service.

With reference to the first aspect of the embodiments of the present disclosure, in a third implementation manner of the first aspect of the embodiments of the present disclosure, when the terminal presets the unconditional call forwarding service, the unconditional call forwarding service is already replaced with a call forwarding on no answer service, and that the unconditional call forwarding service is already enabled is still displayed on an interface displaying a call forwarding service type, executing, by the terminal, a preset first call forwarding policy includes sending, by the terminal, a hang-up instruction to the server, and executing, by the terminal, a preset second call forwarding policy includes sending, by the terminal, a no-response instruction to the server, where the no-response instruction triggers the server to forward the call to the other terminal that is preset.

With reference to the first aspect of the embodiments of the present disclosure, in a fourth implementation manner of the first aspect of the embodiments of the present disclosure, when the terminal presets the unconditional call forwarding service, the unconditional call forwarding service is already replaced with the call forwarding on busy service, and that the unconditional call forwarding service is already enabled is still displayed on an interface displaying a call forwarding service type, executing, by the terminal, a preset first call forwarding policy includes blocking, by the terminal, the call, and executing, by the terminal, a preset second call forwarding policy includes sending, by the terminal, a hang-up instruction to the server, where the hang-up instruction triggers the server to forward the call to the other terminal that is preset.

A second aspect of the embodiments of the present disclosure provides a terminal, including a determining module configured to determine whether the phone number is in a preset blacklist when the terminal receives a call carrying a phone number, and a processing module configured to execute a preset first call forwarding policy when the blacklist includes the phone number, where the first call forwarding policy includes that the terminal blocks or terminates the call, and does not trigger a server to forward the call to another terminal that is preset, or execute a preset second call forwarding policy when the blacklist does not include the phone number, where the terminal presets a call forwarding on busy service or an unconditional call forwarding service.

With reference to the second aspect of the embodiments of the present disclosure, in a first implementation manner of the second aspect of the embodiments of the present disclosure, when the terminal presets the call forwarding on busy service, the processing module is further configured to disable the call forwarding on busy service, send a hang-up instruction to the server, and enable the call forwarding on busy service after the call is terminated if the blacklist includes the phone number, or execute a preset call forwarding policy corresponding to the call forwarding on busy service if the blacklist does not include the phone number.

With reference to the second aspect of the embodiments of the present disclosure, in a second implementation manner of the second aspect of the embodiments of the present disclosure, when the terminal presets the call forwarding on busy service, the processing module is further configured to if the blacklist includes the phone number, block the call, or if the blacklist does not include the phone number, execute a preset call forwarding policy corresponding to the call forwarding on busy service.

With reference to the second aspect of the embodiments of the present disclosure, in a third implementation manner of the second aspect of the embodiments of the present disclosure, when the terminal presets the unconditional call forwarding service, the unconditional call forwarding service is already replaced with a call forwarding on no answer service, and that the unconditional call forwarding service is already enabled is still displayed on an interface displaying a call forwarding service type, and the processing module is further configured to send a hang-up instruction to the server if the blacklist includes the phone number, or send a no-response instruction to the server if the blacklist does not include the phone number, where the no-response instruction triggers the server to forward the call to the other terminal that is preset.

With reference to the second aspect of the embodiments of the present disclosure, in a fourth implementation manner of the second aspect of the embodiments of the present disclosure, when the terminal presets the unconditional call forwarding service, the unconditional call forwarding service is already replaced with the call forwarding on busy service, and that the unconditional call forwarding service is already enabled is still displayed on an interface displaying a call forwarding service type, and the processing module is further configured to block the call if the blacklist includes the phone number, or send a hang-up instruction to the server if the blacklist does not include the phone number, where the hang-up instruction triggers the server to forward the call to the other terminal that is preset.

A third aspect of the embodiments of the present disclosure provides a portable electronic device, including a display, where the display includes a touch-sensitive surface and a display screen, one or more processors, a memory, and one or more programs, where the one or more programs are stored in the memory and are configured to be executed by the one or more processors, the one or more programs include an instruction, and the instruction is used to determine whether the phone number is in a preset blacklist when a call carrying a phone number is received, and execute a preset first call forwarding policy if the blacklist includes the phone number, where the first call forwarding policy includes that the portable electronic device blocks or terminates the call, and does not trigger a server to forward the call to another device that is preset, or execute a preset second call forwarding policy if the blacklist does not include the phone number, where the portable electronic device presets a call forwarding on busy service or an unconditional call forwarding service.

With reference to the third aspect of the embodiments of the present disclosure, in a first implementation manner of the third aspect of the embodiments of the present disclosure, when the portable electronic device presets the call forwarding on busy service, executing a preset first call forwarding policy includes disabling the call forwarding on busy service, sending a hang-up instruction to the server, and enabling the call forwarding on busy service after the call is terminated, and executing a preset second call forwarding policy includes executing a preset call forwarding policy corresponding to the call forwarding on busy service.

With reference to the third aspect of the embodiments of the present disclosure, in a second implementation manner of the third aspect of the embodiments of the present disclosure, when the portable electronic device presets the call forwarding on busy service, executing a preset first call forwarding policy includes blocking the call, and executing a preset second call forwarding policy includes executing a preset call forwarding policy corresponding to the call forwarding on busy service.

With reference to the third aspect of the embodiments of the present disclosure, in a third implementation manner of the third aspect of the embodiments of the present disclosure, when the portable electronic device presets the unconditional call forwarding service, the unconditional call forwarding service is already replaced with a call forwarding on no answer service, and that the unconditional call forwarding service is already enabled is still displayed on an interface displaying a call forwarding service type. Executing a preset first call forwarding policy includes sending a hang-up instruction to the server, and executing a preset second call forwarding policy includes sending a no-response instruction to the server, where the no-response instruction triggers the server to forward the call to the other device that is preset.

With reference to the third aspect of the embodiments of the present disclosure, in a fourth implementation manner of the third aspect of the embodiments of the present disclosure, when the portable electronic device presets the unconditional call forwarding service, the unconditional call forwarding service is already replaced with the call forwarding on busy service, and that the unconditional call forwarding service is already enabled is still displayed on interface displaying a call forwarding service type. Executing a preset first call forwarding policy includes blocking the call, and executing a preset second call forwarding policy includes sending a hang-up instruction to the server, where the hang-up instruction triggers the server to forward the call to the other device that is preset.

It can be seen from the foregoing technical solutions that, the embodiments of the present disclosure have the following advantages.

In the embodiments of the present disclosure, when a terminal in which a call forwarding on busy service or an unconditional call forwarding service is set in advance receives a call carrying a phone number, it is determined whether the phone number is in a preset blacklist. When the blacklist includes the phone number, a first call forwarding policy is used, where the first call forwarding policy includes that the terminal blocks or terminates the call, and does not trigger a server to forward the call to another terminal that is preset, thereby avoiding that when receiving a call carrying a phone number that is in a blacklist, a terminal still forwards the call to another terminal that is preset. Consequently, incoming call interception fails, causing interference for a user.

DESCRIPTION OF EMBODIMENTS

Figure 1:
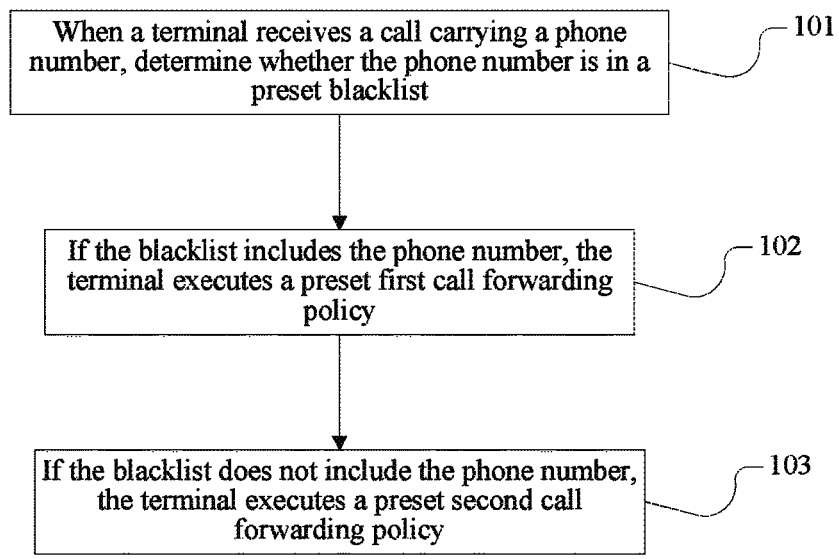
FIG. 1 is a schematic flowchart diagram of an embodiment of a call forwarding method according to an embodiment of the present disclosure.

Embodiments of the present disclosure provide a call forwarding method, a terminal, and a portable electronic device such that a failure of incoming call interception is avoided when a terminal sets unconditional call forwarding or call forwarding on busy.

To make a person skilled in the art understand the technical solutions in the present disclosure better, the following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first," "second," and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include," "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The technologies described herein may be applied to various communications systems, including a second generation (2G) communications system, a third generation (3G) communications system, and a next-generation communications system, for example, a 2G communications system such as a global system for mobile communications (GSM), a 3G communications system such as wideband code division multiple access (WCDMA), and time division-synchronous code division multiple access (TD-SCDMA), and a next-generation communications system such as long term evolution (LTE).

The terminal or the portable electronic device in the embodiments of the present disclosure may be devices for communication in the foregoing communications system, for example, may be a mobile telephone (for example, a mobile phone), a tablet computer having a communication function, and a computer, or for example, may further be a vehicle-mounted communications apparatus. This is not limited herein.

Unstructured supplementary service data (USSD) described in this embodiment of the present disclosure below is a new interactive data service based on a communications network. When a user enters, using a keyboard of the terminal (for example, a mobile phone), some digits and symbols, for example, *#, that are customized in advance by a network, the user may send an instruction to the network (a server) by pressing a dialing key. The network selects a needed service according to the instruction of the user, and provides the needed service to the user.

A call forwarding service mainly has the following four call forwarding modes: unconditional call forwarding, call forwarding on busy, call forwarding on no answer, and call forwarding if out of reach.

The foregoing call forwarding service has a corresponding call forwarding policy in a general scenario, where the call forwarding policy is as follows. The unconditional call forwarding that is, all-incoming-call forwarding, where all incoming calls of the terminal are forwarded to another terminal that is preset. The call forwarding on busy, also referred to as forwarding on engaged, where when a user is in the middle of a call, all incoming calls of the terminal are forwarded to another terminal that is preset. The call forwarding on no answer, where if a call to the terminal is not answered (a preset time to answer a call may be, for example, 30 seconds), all incoming calls of the terminal are forwarded to the other terminal that is preset, and the call forwarding if out of reach, where when normal communication cannot be implemented because the terminal is turned off or is not in an effective service area, or a signal is poor, all incoming calls of the terminal are forwarded to the other terminal that is preset.

USSD instructions for enabling various types of call forwarding services are as follows.

The unconditional call forwarding: **21*target number#dialing key.

The call forwarding on busy: **67*target number#dialing key.

The call forwarding on no answer: **61*target number#dialing key.

The call forwarding if out of reach: **62*target number#dialing key.

Referring to FIG. 1, an embodiment of a call forwarding method according to an embodiment of the present disclosure includes the following steps.

Step 101: When a terminal receives a call carrying a phone number, determine whether the phone number is in a preset blacklist.

In this embodiment, when the terminal receives the call carrying the phone number, it is determined whether the phone number is in the preset blacklist. The preset blacklist may be a blacklist preset by a user, may be a blacklist obtained from a network, or the like. This is not limited herein.

Step 102: If the blacklist includes the phone number, the terminal executes a preset first call forwarding policy.

In this embodiment, the first call forwarding policy includes that the terminal blocks or terminates the call, and does not trigger a server to forward the call to another terminal that is preset in order to prevent an incoming call from being forwarded to the other terminal that is preset when a phone number in the blacklist calls the terminal.

Step 103: If the blacklist does not include the phone number, the terminal executes a preset second call forwarding policy.

In this embodiment, the terminal presets a call forwarding on busy service or an unconditional call forwarding service. The second call forwarding policy may be a call forwarding policy corresponding to the call forwarding on busy service or the unconditional call forwarding service. For example, when the terminal presets the call forwarding on busy service, the terminal executes the preset call forwarding policy corresponding to the call forwarding on busy service. This is not limited herein.

In this embodiment of the present disclosure, when a terminal in which a call forwarding on busy service or an unconditional call forwarding service is set in advance receives a call carrying a phone number, it is determined whether the phone number is in a preset blacklist. When the blacklist includes the phone number, a first call forwarding policy is used, where the first call forwarding policy includes that the terminal blocks or terminates the call, and does not trigger a server to forward the call to another terminal that is preset, thereby avoiding that when receiving a call carrying a phone number that is in the blacklist, the terminal still forwards the call to the other terminal that is preset. Consequently, incoming call interception fails, causing interference for a user.

In the embodiment shown in FIG. 1, the terminal may preset the call forwarding on busy service or the unconditional call forwarding service, and a detailed description is given below using a specific embodiment.

The terminal presets the call forwarding on busy service.

Figure 2:
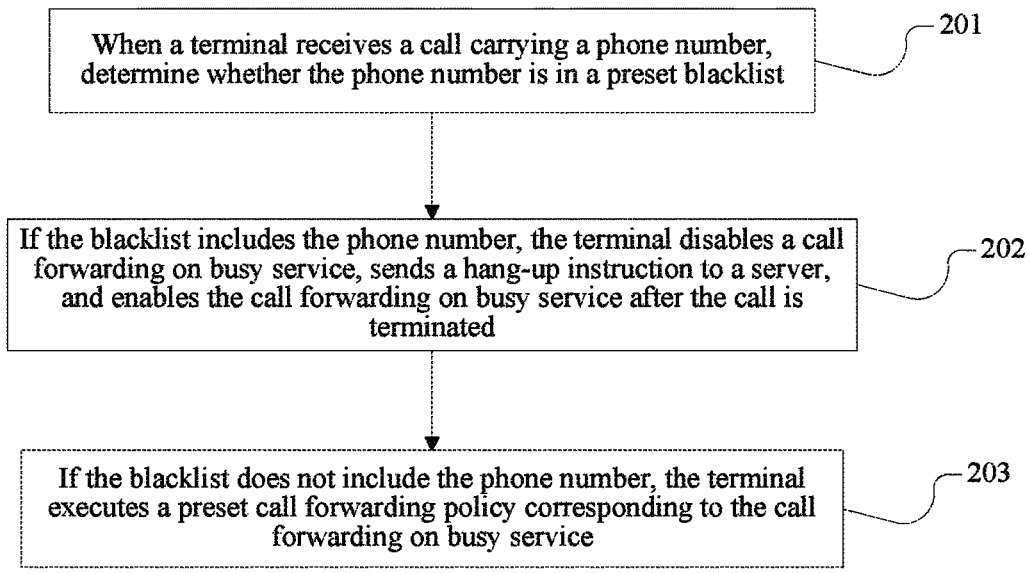
FIG. 2 is a schematic flowchart diagram of another embodiment of a call forwarding method according to an embodiment of the present disclosure.

Referring to FIG. 2, another embodiment of a call forwarding method according to an embodiment of the present disclosure includes the following steps.

Step 201: When a terminal receives a call carrying a phone number, determine whether the phone number is in a preset blacklist.

In this embodiment, when the terminal receives the call carrying the phone number, it is determined whether the phone number is in the preset blacklist. The preset blacklist may be a blacklist preset by a user, may be a blacklist obtained from a network, or the like. This is not limited herein.

Step 202: If the blacklist includes the phone number, the terminal disables a call forwarding on busy service, sends a hang-up instruction to the server, and enables the call forwarding on busy service after the call is terminated.

In this embodiment, when the blacklist includes the phone number, a preset first call forwarding policy is executed, where the preset first call forwarding policy includes disabling, by the terminal, the call forwarding on busy service and sending a hang-up instruction to the server. The hang-up instruction triggers the server to terminate the call. After the call is terminated, the call forwarding on busy service is enabled. For example, the call forwarding on busy service is disabled by means of a USSD instruction: #67#dialing key, then the hang-up instruction "call rejected" is sent to the server, and after the call is terminated, the call forwarding on busy service is enabled by means of a USSD instruction: **67*target number#dialing key.

In other approaches, a blacklist is preset. Therefore, when a terminal receives a call carrying a phone number that is in the blacklist, the terminal sends a hang-up instruction to a server in order to hang up the call. When receiving the hang-up instruction, the server considers that the terminal is busy. In addition, because the server knows that a call forwarding on busy service is set in the terminal, the server executes the call forwarding on busy service. Consequently, incoming call interception for a number that is in the blacklist fails, that is, the call carrying the phone number that is in the blacklist is forwarded to another terminal that is preset, and it is considered that the incoming call interception fails.

In this embodiment, when receiving the call, the terminal disables the call forwarding on busy service, and sends the hang-up instruction to the server such that the server terminates the call. After the call is terminated, the call forwarding on busy service is enabled. In this way, it is avoided that when the terminal receives a call carrying a phone number that is in the blacklist, a call forwarding policy corresponding to the call forwarding on busy service is directly executed, and the server is triggered to forward the call to another terminal that is preset.

Step 203: If the blacklist does not include the phone number, the terminal executes a preset call forwarding policy corresponding to the call forwarding on busy service.

The terminal presets the call forwarding on busy service or an unconditional call forwarding service.

In this embodiment, a second call forwarding policy different from the first call forwarding policy is preset. After it is determined that the blacklist does not include the phone number, the preset second call forwarding policy is executed. The second call forwarding policy in this embodiment is the call forwarding policy corresponding to the call forwarding on busy service. For example, if the terminal is in the middle of a call, all incoming calls of the terminal are forwarded to the other terminal that is preset. If the terminal is not engaged, a normal call is kept. Alternatively, it may be understood that the second call forwarding policy may be another call forwarding policy that is preset. This is not limited herein.

When the terminal stays in a state of receiving a call, the terminal may further send the hang-up instruction to the server after receiving an instruction of software such as a phone manager. The hang-up instruction triggers the call forwarding on busy service, that is, the hang-up instruction triggers the server to forward the call to the other terminal that is preset.

Figure 3:
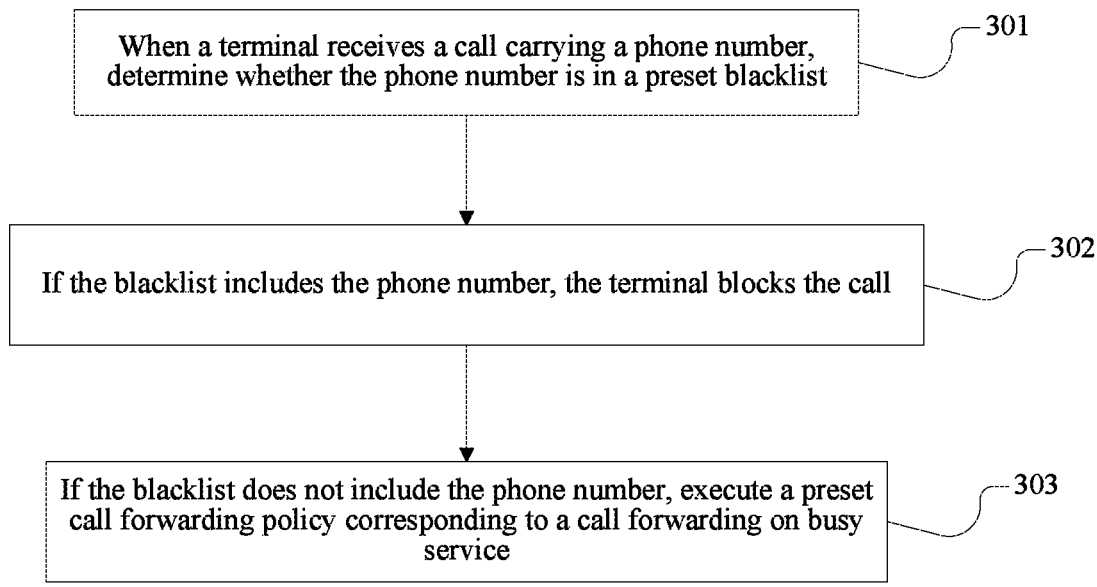
FIG. 3 is a schematic flowchart diagram of another embodiment of a call forwarding method according to an embodiment of the present disclosure.

In the embodiment shown in FIG. 2, when the terminal presets the call forwarding on busy service, the terminal may also execute the preset first call forwarding policy and execute the preset second call forwarding policy in another manner. Referring to FIG. 3, another embodiment of a call forwarding method according to an embodiment of the present disclosure includes the following steps.

Step 301: When a terminal receives a call carrying a phone number, determine whether the phone number is in a preset blacklist.

In this embodiment, when the terminal receives the call carrying the phone number, it is determined whether the phone number is in the preset blacklist. The preset blacklist may be a blacklist preset by a user, may be a blacklist obtained from a network, or the like. This is not limited herein.

Step 302: If the blacklist includes the phone number, the terminal blocks the call.

In this embodiment, when the blacklist includes the phone number, the terminal executes the preset first call forwarding policy. In this embodiment, executing, by the terminal, the preset first call forwarding policy includes blocking the call. The blocking the call includes making no response to, providing no display for, and giving no prompt for the received call. In this way, because the call is blocked, and a hang-up instruction is not sent to a server, the server does not consider that the terminal is busy and does not trigger a call forwarding on busy service. The terminal blocks the call, thereby avoiding that when receiving a call carrying a phone number that is in the blacklist, the terminal still forwards the call to another terminal that is preset, which consequently causes incoming call interception to fail, causing interference for a user.

Step 303: If the blacklist does not include the phone number, execute a preset call forwarding policy corresponding to the call forwarding on busy service.

In this embodiment, a second call forwarding policy different from the first call forwarding policy is preset. After it is determined that the blacklist does not include the phone number, the preset second call forwarding policy is executed. The second call forwarding policy in this embodiment is the call forwarding policy corresponding to the call forwarding on busy service. For example, if the terminal is in the middle of a call, all incoming calls of the terminal are forwarded to another terminal preset by the terminal. If the terminal is not engaged, a normal call is kept. Alternatively, it may be understood that the second call forwarding policy may be another call forwarding policy that is preset. This is not limited herein.

When the terminal stays in a state of receiving a call, the terminal may further send the hang-up instruction to the server after receiving an instruction of software such as a phone manager. The hang-up instruction triggers the call forwarding on busy service, that is, the hang-up instruction triggers the server to forward the call to the other terminal that is preset.

The terminal presets the unconditional call forwarding service.

When the terminal presets the unconditional call forwarding service, the unconditional call forwarding service is already replaced with a target call forwarding service, and that the unconditional call forwarding service is already enabled is still displayed on an interface displaying a call forwarding service type.

The unconditional call forwarding service is already replaced with the target call forwarding service. When receiving an instruction of enabling the unconditional call forwarding service from a user, the terminal enables the target call forwarding service, and that the unconditional call forwarding service is enabled is displayed on the interface that displays the call forwarding service type and that is of the terminal. In this case, when the terminal receives the instruction of enabling the unconditional call forwarding service from the user, the terminal actually enables the target call forwarding service. The target call forwarding service is a non-unconditional call forwarding service (for example, a call forwarding on no answer service or the call forwarding on busy service). However, that the unconditional call forwarding service is enabled for the user may be displayed on the interface that displays the call forwarding service type and that is of the terminal.

Receiving, by the terminal, the instruction of enabling the unconditional call forwarding service from the user may include selecting, by the user on a user interface an instruction triggered by the unconditional call forwarding service, where the instruction is an instruction sent to a system or an application in the terminal, and is defined by the system or the application in the terminal. After receiving the instruction, the system or the application in the terminal sends a USSD instruction of enabling a target call forwarding service to the server. In actual use, when receiving the instruction of enabling the unconditional call forwarding service from the user, the terminal enables the target call forwarding service. Alternatively, the user enters, using an input apparatus (for example, a keyboard or a touchscreen) of the terminal, the USSD instruction of enabling the unconditional call forwarding service. After recognizing the USSD instruction entered by the user, the terminal automatically converts the USSD instruction of the unconditional call forwarding into a USSD instruction of the target call forwarding service (which is still displayed as the USSD instruction of the unconditional call forwarding service on a display interface). After the user presses a dialing key, the terminal sends the USSD instruction of enabling the target call forwarding service to the server in order to enable the target call forwarding service. This is not limited herein.

In this case, there may be multiple possibilities of the target call forwarding service. For example, the target call forwarding service may be the call forwarding on no answer service or the call forwarding on busy service. This is not limited herein. A detailed description is given below with reference to a specific embodiment.

When the target call forwarding service is the call forwarding on no answer service, that is, when the terminal presets the unconditional call forwarding service, the unconditional call forwarding service is already replaced with the call forwarding on no answer service, and that the unconditional call forwarding service is already enabled is still displayed on the interface displaying the call forwarding service type.

Figure 4:
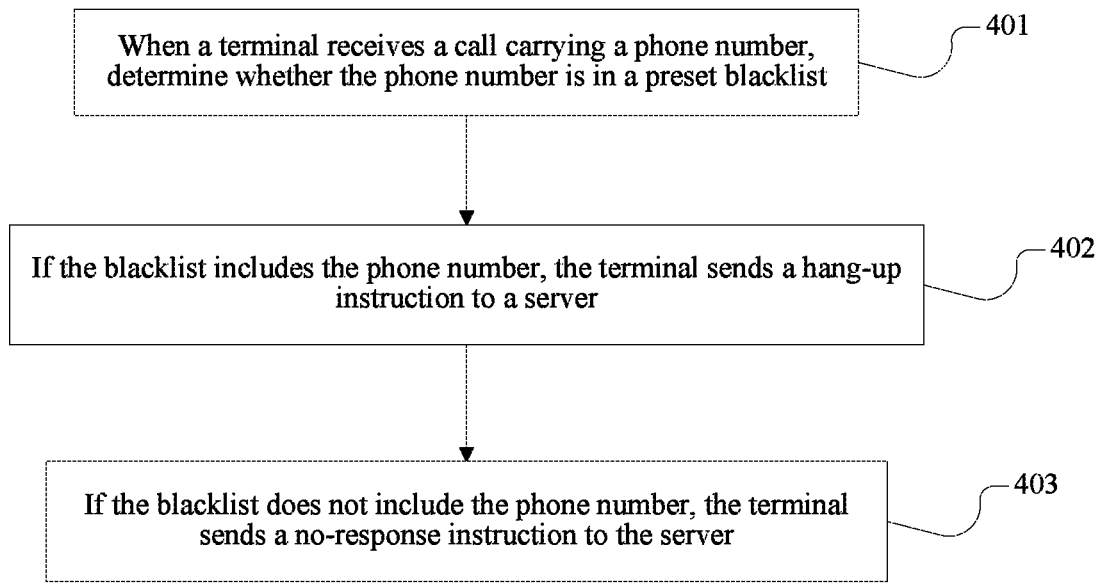
FIG. 4 is a schematic flowchart diagram of another embodiment of a call forwarding method according to an embodiment of the present disclosure.

Referring to FIG. 4, another embodiment of a call forwarding method according to an embodiment of the present disclosure includes the following steps.

Step 401: When a terminal receives a call carrying a phone number, determine whether the phone number is in a preset blacklist.

In this embodiment, the terminal presets an unconditional call forwarding service. Further, when the terminal presets the unconditional call forwarding service, the unconditional call forwarding service is already replaced with a call forwarding on no answer service, and that the unconditional call forwarding service is already enabled is still displayed on an interface displaying a call forwarding service type.

Further, when the terminal receives an instruction of enabling the unconditional call forwarding service from a user, the call forwarding on no answer service is actually enabled (that is, the unconditional call forwarding service is already replaced with the call forwarding on no answer service), and that the unconditional call forwarding service is already enabled is still displayed on the interface displaying the call forwarding service type. A specific process may include that when the terminal receives the instruction triggered when the user selects an unconditional call forwarding service on a user interface sending a USSD instruction "**61*target number#dialing key" to a server in order to enable the call forwarding on no answer service, or when the user enters, using an input apparatus (for example, a keyboard or a touchscreen) of the terminal, a USSD instruction of enabling the unconditional call forwarding service, after the terminal recognizes the USSD instruction entered by the user, automatically converting, by the terminal, a USSD instruction of unconditional call forwarding into a USSD instruction of call forwarding on no answer (which is still displayed as a USSD instruction of the unconditional call forwarding service). After the user presses a dialing key, the terminal sends the USSD instruction of enabling the call forwarding on no answer service to the server in order to enable the call forwarding on no answer service. This is not limited herein.

Before sending the USSD instruction obtained after conversion to the server, the terminal may further prompt the user whether to enable a blacklist interception function in call forwarding. Content of a prompt may be a benefit of enabling the blacklist interception function in the call forwarding and possible costs.

In this embodiment, when the terminal receives the call carrying the phone number, it is determined whether the phone number is in the preset blacklist. The preset blacklist may be a blacklist preset by a user, may be a blacklist obtained from a network, or the like. This is not limited herein.

Step 402: If the blacklist includes the phone number, the terminal sends a hang-up instruction to the server.

In this embodiment, when the phone number carried in the call is in the preset blacklist, the terminal executes a first call forwarding policy. The first call forwarding policy includes sending the hang-up instruction to the server, where the hang-up instruction triggers the server to terminate the call. For example, the hang-up instruction "call rejected" is sent to the server, and after receiving the hang-up instruction, the server terminates the call.

The preset unconditional call forwarding service in this embodiment includes the enabled call forwarding on no answer service. That the unconditional call forwarding service is enabled is displayed on an interface of the terminal, that is, the terminal actually enables the call forwarding on no answer service. Sending of a no-response instruction triggers the server to forward the call only when the call forwarding on no answer has no response within a preset time. Therefore, sending of the hang-up instruction herein does not trigger the server to forward the call to another terminal that is preset.

Step 403: If the blacklist does not include the phone number, the terminal sends a no-response instruction to the server.

The no-response instruction triggers the server to forward the call to the other terminal that is preset.

In this embodiment, a second call forwarding policy different from the first call forwarding policy is preset. When the blacklist does not include the phone number, the terminal executes the second call forwarding policy, where the second call forwarding policy includes sending the no-response instruction to the server, where the no-response instruction triggers the server to forward the call to the other terminal that is preset. For example, the no-response instruction "no user responding" is sent to the server, and after receiving the no-response instruction, the server forwards the call to the other terminal that is preset. Alternatively, it may be understood that the second call forwarding policy may be another call forwarding policy that is preset. This is not limited herein.

In this embodiment, when the blacklist does not include the phone number, the terminal sends the no-response instruction to the server, where the no-response instruction triggers the server to perform call forwarding on no answer in order to forward the call to the other terminal that is preset. In this case, an effect of an unconditional call forwarding service of a normal whitelist may be implemented.

When the target call forwarding service is a call forwarding on busy service, that is, when the terminal presets the call forwarding on busy service, the unconditional call forwarding service is already replaced with the call forwarding on busy service, and that the unconditional call forwarding service is already enabled is still displayed on the interface displaying the call forwarding service type.

Figure 5:
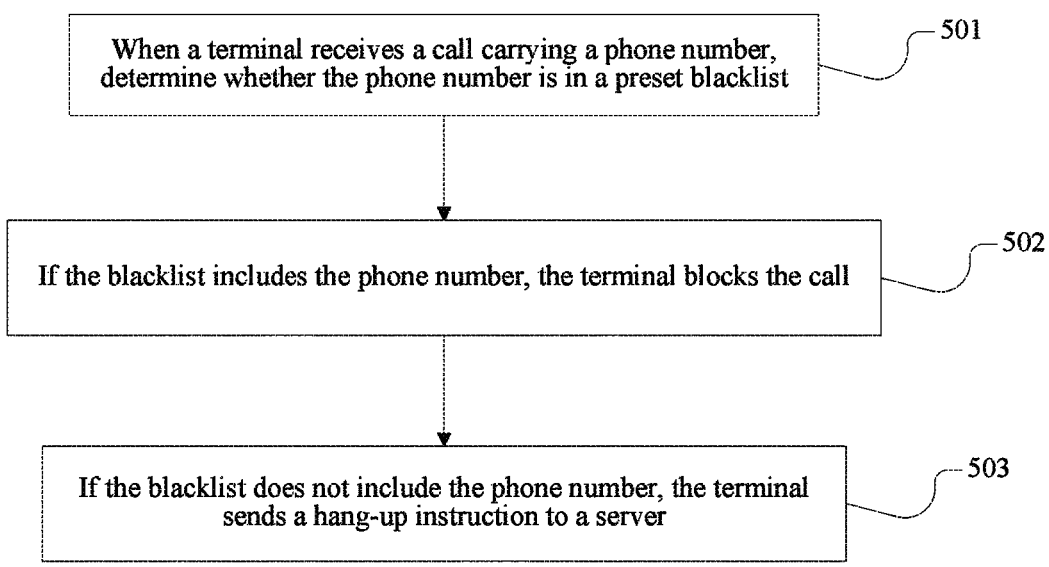
FIG. 5 is a schematic flowchart diagram of another embodiment of a call forwarding method according to an embodiment of the present disclosure.

Referring to FIG. 5, another embodiment of a call forwarding method according to an embodiment of the present disclosure includes the following steps.

Step 501: When a terminal receives a call carrying a phone number, determine whether the phone number is in a preset blacklist.

In this embodiment, the terminal presets an unconditional call forwarding service. When the terminal presets the unconditional call forwarding service, the unconditional call forwarding service is already replaced with a call forwarding on busy service, and that the unconditional call forwarding service already enabled is still displayed on an interface displaying a call forwarding service type.

Further, when receiving an instruction of enabling the unconditional call forwarding service from a user, the terminal actually enables the call forwarding on busy service (that is, the unconditional call forwarding service is already replaced with the call forwarding on busy service), and that the unconditional call forwarding service is enabled is still displayed on the interface displaying the call forwarding service type. A specific process may include that when the terminal receives the instruction triggered when the user selects the unconditional call forwarding service on a user interface, enabling the call forwarding on busy service using a USSD instruction "**67*target number#dialing key", or when the user enters, using an input apparatus (for example, a keyboard or a touchscreen) of the terminal, a USSD instruction of enabling the unconditional call forwarding service, after the terminal recognizes the USSD instruction entered by a user, automatically converting, by the terminal, the USSD instruction of the unconditional call forwarding into a USSD instruction of the call forwarding on busy service (which is still displayed as the instruction of the unconditional call forwarding service on a display interface). After the user presses a dialing key, the terminal sends the USSD instruction of the call forwarding on busy service to a server in order to enable the call forwarding on busy service. This is not limited herein In this embodiment, before sending the USSD instruction obtained after conversion to the server, the terminal may further prompt the user whether to enable a blacklist interception function in call forwarding. Content of a prompt may be a benefit of enabling the blacklist interception function in the call forwarding and possible costs.

In this embodiment, when the terminal receives the call carrying the phone number, it is determined whether the phone number is in the preset blacklist. The preset blacklist may be a blacklist preset by a user, may be a blacklist obtained from a network, or the like. This is not limited herein.

Step 502: If the blacklist includes the phone number, the terminal blocks the call.

In this embodiment, when the blacklist includes the phone number, the terminal executes a preset first call forwarding policy. In this embodiment, executing, by the terminal, a preset first call forwarding policy includes blocking the call. The blocking the call includes making no response to, providing no display for, and giving no prompt for the call. In this way, because the call is blocked, and a hang-up instruction is not sent to a server, the server does not consider that the terminal is busy and does not trigger a call forwarding on busy service, that is, does not trigger the server to forward the call to another terminal that is preset. The terminal blocks the call, thereby avoiding that when receiving a call carrying a phone number that is in the blacklist, the terminal still forwards the call to the other terminal that is preset, which consequently causes incoming call interception to fail, causing interference for a user.

Step 503: If the blacklist does not include the phone number, the terminal sends a hang-up instruction to a server.

The hang-up instruction triggers the server to forward the call to the other terminal that is preset.

In this embodiment, a second call forwarding policy different from the first call forwarding policy is preset. When the blacklist does not include the phone number, the preset second call forwarding policy is executed. In this embodiment, the second call forwarding policy further includes sending the hang-up instruction to the server, where the hang-up instruction triggers the server to forward the call to the other terminal that is preset. When receiving the hang-up instruction, the server considers that the terminal is busy. The server is triggered to forward the call to the other terminal that is preset. For example, the hang-up instruction "call rejected" is sent to the server. After receiving the hang-up instruction, the server forwards the call to the other terminal that is preset. An effect of an unconditional call forwarding service of a conventional whitelist may be implemented. Alternatively, it may be understood that the second call forwarding policy may be another call forwarding policy that is preset. This is not limited herein.

In addition, a computer readable medium (or medium) is further provided, including a computer readable instruction performing the following operations when executed performing operations of steps 101 to 103 (steps 201 to 203, steps 301 to 303, steps 401 to 403 or steps 501 to 503) of the method in the foregoing embodiment.

In addition, a computer program product is further provided, including the foregoing computer readable medium.

Figure 6:
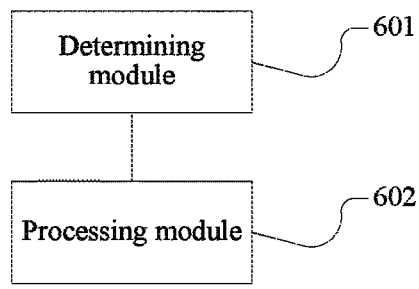
FIG. 6 is a schematic diagram of an embodiment of a terminal according to an embodiment of the present disclosure.

An embodiment of a terminal according to an embodiment of the present disclosure is described below. Referring to FIG. 6, an embodiment of the terminal according to this embodiment of the present disclosure includes a determining module 601 configured to determine whether the phone number is in a preset blacklist when the terminal receives a call carrying a phone number, and a processing module 602 configured to execute a preset first call forwarding policy when the blacklist includes the phone number, where the first call forwarding policy includes that the terminal blocks or terminates the call, and does not trigger a server to forward the call to another terminal that is preset, or execute a preset second call forwarding policy when the blacklist does not include the phone number, where the terminal presets a call forwarding on busy service or an unconditional call forwarding service.

In this embodiment of the present disclosure, the call forwarding on busy service or the unconditional call forwarding service is set in advance in the terminal, when receiving the call carrying the phone number, the determining module 601 determines whether the phone number is in the preset blacklist. When the blacklist includes the phone number, the processing module 602 uses the first call forwarding policy, where the first call forwarding policy includes that the terminal blocks or terminates the call, and does not trigger the server to forward the call to the other terminal that is preset, thereby avoiding that when receiving a call carrying a phone number that is in the blacklist, the terminal still forwards the call to the other terminal that is preset, which consequently causes incoming call interception to fail, causing interference for a user.

Optionally, when the terminal presets the call forwarding on busy service, the processing module 602 is further configured to disable the call forwarding on busy service, send a hang-up instruction to the server, and enable the call forwarding on busy service after the call is terminated if the blacklist includes the phone number, or execute a preset call forwarding policy corresponding to the call forwarding on busy service if the blacklist does not include the phone number.

Optionally, when the terminal presets the call forwarding on busy service, the processing module 602 is further configured to block the call if the blacklist includes the phone number, or execute the preset call forwarding policy corresponding to the call forwarding on busy service if the blacklist does not include the phone number.

Optionally, in some embodiments of the present disclosure, when the terminal presets the unconditional call forwarding service, the unconditional call forwarding service is already replaced with a call forwarding on no answer service, and that the unconditional call forwarding service is already enabled is still displayed on an interface displaying a call forwarding service type.

The processing module 602 is further configured to replace the unconditional call forwarding service with a call forwarding on no answer service if the blacklist includes the phone number, or send a no-response instruction to the server if the blacklist does not include the phone number, where the no-response instruction triggers the server to forward the call to the other terminal that is preset.

Optionally, when the terminal presets the unconditional call forwarding service, the unconditional call forwarding service is already replaced with the call forwarding on busy service, and that the unconditional call forwarding service is already enabled is still displayed on the interface displaying the call forwarding service type.

The processing module 602 is further configured to block the call if the blacklist includes the phone number, or send the hang-up instruction to the server if the blacklist does not include the phone number, where the hang-up instruction triggers the server to forward the call to the other terminal that is preset.

The foregoing describes the terminal in this embodiment of the present disclosure from a perspective of modular functional entities, and the following describes the terminal in this embodiment of the present disclosure from a perspective of hardware processing.

A portable electronic device (not shown) provided in an embodiment of the present disclosure, including a display, where the display includes a touch-sensitive surface and a display screen, one or more processors, a memory, and one or more programs, where the one or more programs are stored in the memory and are configured to be executed by the one or more processors, the one or more programs include an instruction, and the instruction is used to determine whether the phone number is in a preset blacklist when a call carrying a phone number is received, and execute a preset first call forwarding policy if the blacklist includes the phone number, where the first call forwarding policy includes that a terminal blocks or terminates the call, and does not trigger a server to forward the call to another device that is preset, or execute a preset second call forwarding policy if the blacklist does not include the phone number, where the portable electronic device presets a call forwarding on busy service or an unconditional call forwarding service.

Optionally, when the portable electronic device presets the call forwarding on busy service, executing a preset first call forwarding policy includes disabling the call forwarding on busy service, sending a hang-up instruction to the server, and enabling the call forwarding on busy service after the call is terminated, and executing a preset second call forwarding policy includes executing a preset call forwarding policy corresponding to the call forwarding on busy service.

Optionally, when the portable electronic device presets the call forwarding on busy service, executing a preset first call forwarding policy includes blocking the call, and executing a preset second call forwarding policy includes executing a preset call forwarding policy corresponding to the call forwarding on busy service.

Optionally, in some embodiments of the present disclosure, when the portable electronic device presets the unconditional call forwarding service, the unconditional call forwarding service is already replaced with a call forwarding on no answer service, and that the unconditional call forwarding service is already enabled is still displayed on an interface displaying a call forwarding service type.

Executing a preset first call forwarding policy includes sending a hang-up instruction to the server, and executing a preset second call forwarding policy includes sending a no-response instruction to the server, where the no-response instruction triggers the server to forward the call to the other device that is preset.

Optionally, when the portable electronic device presets the unconditional call forwarding service, the unconditional call forwarding service is already replaced with the call forwarding on busy service, and that the unconditional call forwarding service is already enabled is still displayed on an interface displaying a call forwarding service type.

Executing a preset first call forwarding policy includes blocking the call, and executing a preset second call forwarding policy includes sending a hang-up instruction to the server, where the hang-up instruction triggers the server to forward the call to the other device that is preset.

Figure 7:
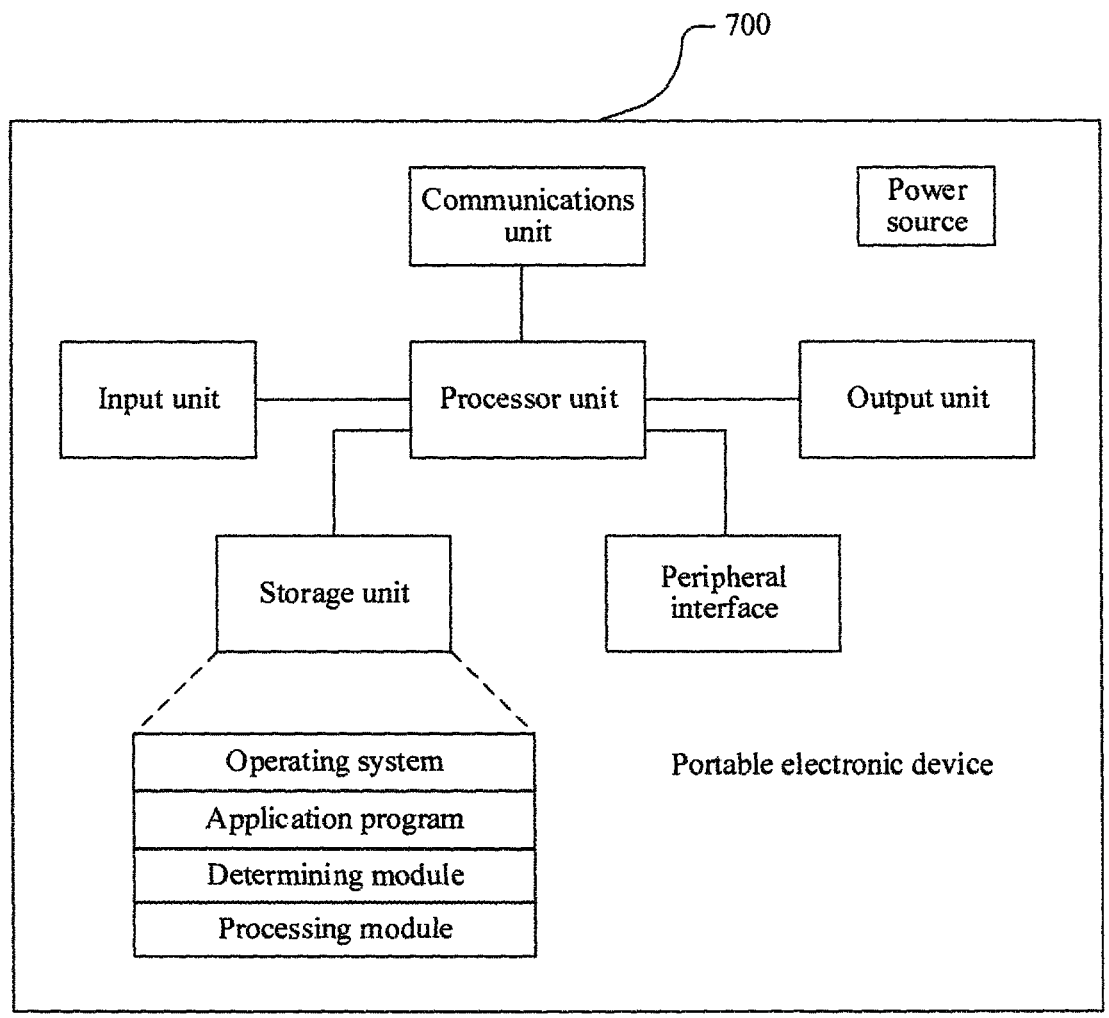
FIG. 7 is a schematic diagram of an embodiment of a portable electronic device according to an embodiment of the present disclosure.

The portable electronic device in this embodiment of the present disclosure is described below with reference to a specific application scenario. FIG. 7 shows a portable electronic device 700 according to a specific implementation manner of the present disclosure. The portable electronic device 700 includes an input unit, a processor unit, an output unit, a communications unit, a storage unit, a peripheral interface, and a power source. These units communicate with each other using one or more buses. A person skilled in the other approaches may understand that a structure of the portable electronic device 700 shown in the figure does not limit the present disclosure. The structure may be bus-shaped, may be star-shaped, or may include components more or less than those shown in the FIG. 7, a combination of some components, or different component layouts. In this implementation manner of the present disclosure, the portable electronic device 700 may be any moving or portable terminal, including but not limited to a mobile telephone, a mobile computer, a tablet computer, a personal digital assistant (PDA), a media player, a smart television, a combination of two or more of the foregoing items, and the like.

The input unit is configured to implement interaction between a user and the portable electronic device 700 and/or input of information to the portable electronic device 700. For example, the input device may receive number or character information entered by the user, to generate signal input related to a user setting or function control. In a specific implementation manner of the present disclosure, the input unit may be a touch panel, or may be another human-computer interaction interface such as a physical input key or a microphone, or may be another external information capturing apparatus such as a camera. The touch panel, which is also referred to as a touchscreen or a touch screen, can obtain an operation action of the user on or near the touch panel, for example, an operation action of the user on the touch panel or at a position near the touch panel using any suitable object or accessory such as a finger or a stylus, and drive a corresponding connected apparatus according to a preset program. Optionally, the touch panel may include two parts, a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to the processor unit. The touch controller may further receive a command sent by the processor unit and execute the command. In addition, the touch panel may be a resistive, capacitive, infrared, or surface acoustic wave touch panel. In another implementation manner of the present disclosure, the physical input key used by the input unit may include, but is not limited to, one or more of a physical keyboard, a functional key (such as a volume control key or a switch key), a trackball, a mouse, and a joystick. The input unit in a microphone form may collect voice input by a user or from an environment, and convert the voice into a command that is in a form of an electrical signal and that is executable by the processor unit.

In some embodiments of the present disclosure, the input unit may be various types of sensors, for example, a Hall component configured to detect a physical quantity, for example, a force, a torque, a pressure, a stress, a location, a displacement, a speed, an acceleration, an angle, an angular velocity, revolutions, a rotational speed, and a time at which a working state changes. The physical quantity is converted into an electrical quantity for detection and control. Other sensors may include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The output unit includes but is not limited to an image output unit (not shown) and an audio output unit (not shown). The image output unit is configured to output a text, an image, and/or a video. The image output unit may include a display panel. For example, the display panel may be configured using forms such as a liquid crystal display (LCD), an organic light-emitting diode (OLED), and a field emission display (FED). Alternatively, the image output unit may include a reflective display, for example, an electrophoretic display, or a display using a technology of interferometric modulation of light. The image output unit may include a single display or multiple displays of different sizes. In a specific implementation manner of the present disclosure, the display panel used by the foregoing input unit may also be used as a display panel of the output unit. For example, after detecting touch on the touch panel or a gesture operation near the touch panel, the touch panel transmits the touch or gesture operation to the processor unit to determine a type of a touch event, and subsequently, the processor unit provides corresponding visual output on the display panel according to the type of the touch event. Although in FIG. 7, the input unit and the output unit are used as two independent components to implement an input function and an output function of the portable electronic device 700, in some embodiments, the touch panel may be integrated with the display panel to implement the input function and the output function of the portable electronic device 700. For example, the image output unit may display various graphical user interfaces as virtual control components, including but not limited to windows, scroll bars, icons, and scrapbooks, for a user to perform an operation in a touch manner.

In a specific implementation manner of the present disclosure, the image output unit includes a filter and an amplifier, which are configured to filter and amplify a video output by the processor unit. The audio output unit includes a digital analog converter configured to convert an audio signal output by the processing unit from a digital format into an analog format.

The processor unit is a control center of the portable electronic device 700, connects various parts of an entire portable electronic device 700 by means of various interfaces and lines, and executes various functions of the portable electronic device 700 and/or processes data by running or executing a software program and/or a module stored in the storage unit and by invoking data stored in the storage unit. The processor unit may include an integrated circuit (IC), for example, may include a single packaged IC, or may include multiple packaged ICs that have a same function or different functions. For example, the processor unit may include only a central processing unit (CPU), or may be a combination of a graphics processing unit (GPU), a digital signal processor (DSP), and a control chip (for example, a baseband chip) in a communications management module. In an implementation manner of the present disclosure, the CPU may be a single computing core or may include multiple computing cores.

The communications unit is configured to establish a communication channel such that the portable electronic device 700 performs voice communication, text communication, and data communication with a remote electronic device or a server using the communication channel. The communications unit may include a communications module (not shown) such as a wireless local area network (WLAN) module, a BLUETOOTH module, or a baseband module, and a radio frequency (RF) circuit that corresponds to the communications module, and the communications unit is configured to perform communication of a WLAN, communication of BLUETOOTH, communication of infrared and/or communication of a cellular communications system, for example, WCDMA and/or high speed downlink packet access (HSDPA). The communications module is configured to control communication between components in the portable electronic device 700, and may support direct memory access.

In different implementation manners of the present disclosure, various communications modules in the communications unit generally appear in a form of IC chips, selective combination may be performed on the various communications modules, and the communications unit does not necessarily include all communications modules and corresponding antenna groups. For example, the communications unit may include merely a baseband chip, an RF chip, and a corresponding antenna to provide a communication function in a cellular communications system. The portable electronic device 700 may be connected to a cellular network or the internet using a wireless communications connection, for example, WLAN access or WCDMA access, established by the communications unit.

The RF circuit is configured to receive and send a signal during an information receiving and sending process or during a call. For example, after downlink information of a base station is received, the downlink information is sent to the processor unit for processing, and in addition, designed uplink data is sent to the base station. Usually, the RF circuit includes a known circuit for performing these functions, which includes but is not limited to an antenna system, an RF transceiver, one or more amplifiers, a tuner, one or more oscillators, a DSP, a codec chip set, a subscriber identity module (SIM), a memory, and the like. In addition, the RF circuit may also communicate with a network and another device by means of wireless communication. The wireless communication may use any communications standard or protocol, which includes but is not limited to a GSM, a general packet radio service (GPRS), code division multiple access (CDMA), WCDMA, HSDPA, LTE, an electronic mail (e-mail), an short messaging service (SMS), and the like.

The storage unit may be configured to store a software program and a module. The processor unit runs the software program and the module that are stored in the storage unit to execute various functional applications of the portable electronic device 700 and implement data processing. The storage unit mainly includes a program storage area and a data storage area. The program storage area may store an operating system, an application program required by at least one function, such as a sound play program and an image display program. The data storage area may store data (such as audio data and an address book) created according to use of the portable electronic device and the like. In a specific implementation manner of the present disclosure, the storage unit may include a volatile memory, for example, a nonvolatile random access memory (NVRAM), a phase change random access memory (PRAM), and a magnetoresistive random access memory (MRAM), and may further include a nonvolatile memory, for example, at least one magnetic disk storage, an electrically erasable programmable read-only memory (EEPROM), and a flash component, for example, a NOR flash memory or a NAND flash memory. The nonvolatile memory stores the operating system and the application program that are executed by the processing unit. The processing unit loads a running program and data from the nonvolatile memory to memory, and stores digital content in a massive storage apparatus. The operating system is used for control and management of conventional system tasks such as memory management, storage device control, and power management, and various components and/or drivers that facilitate communication between various types of software and hardware. In this implementation manner of the present disclosure, the operating system may be an ANDROID system of the GOOGLE Incorporation, an IOS system developed by the APPLE Incorporation, or a WINDOWS system/WINDOWS Phone system developed by the MICROSOFT Corporation, or an embedded operating system of VSWORKS.

The application program includes any application installed on the portable electronic device 700, including but not limited to a browser, an e-mail, an instant message service, text processing, keyboard virtualization, a window widget, encryption, digital copyright management, speech recognition, speech replication, positioning (for example, a function provided by the global positioning system), music playing, and the like.

In this embodiment of the present disclosure, the storage unit includes a processing module and a determining module.

The determining module is configured to perform the following operations using the processor unit: determining whether the phone number is in a preset blacklist when a terminal receives a call carrying a phone number.

The processing module is further configured to perform the following operations using the processor unit executing a preset first call forwarding policy when the blacklist includes the phone number, where the first call forwarding policy includes that the terminal blocks or terminates the call, and does not trigger a server to forward the call to another terminal that is preset, or executing a preset second call forwarding policy when the blacklist does not include the phone number, where the terminal presets a call forwarding on busy service or an unconditional call forwarding service.

Optionally, in some embodiments of the present disclosure, when the terminal presets the call forwarding on busy service, the processing module is further configured to perform the following operations using the processor unit: disabling the call forwarding on busy service, sending a hang-up instruction to the server, and enabling the call forwarding on busy service after the call is terminated if the blacklist includes the phone number, or executing a preset call forwarding policy corresponding to the call forwarding on busy service if the blacklist does not include the phone number.

Optionally, when the terminal presets the call forwarding on busy service, the processing module is further configured to perform the following operations using the processor unit: blocking the call if the blacklist includes the phone number, or executing the preset call forwarding policy corresponding to the call forwarding on busy service if the blacklist does not include the phone number.

Optionally, when the terminal presets the unconditional call forwarding service, the unconditional call forwarding service is already replaced with a call forwarding on no answer service, and that the unconditional call forwarding service is already enabled is still displayed on an interface displaying a call forwarding service type.

The processing module is further configured to send a hang-up instruction to the server if the blacklist includes the phone number, or send a no-response instruction to the server if the blacklist does not include the phone number, where the no-response instruction triggers the server to forward the call to the other terminal that is preset.

Optionally, in some embodiments of the present disclosure, when the terminal presets the unconditional call forwarding service, the unconditional call forwarding service is already replaced with the call forwarding on busy service, and that the unconditional call forwarding service is already enabled is still displayed on an interface displaying a call forwarding service type.

The processing module is further configured to block the call if the blacklist includes the phone number, or send a hang-up instruction to the server if the blacklist does not include the phone number, where the hang-up instruction triggers the server to forward the call to the other terminal that is preset.

The power source is configured to supply power to different components of the portable electronic device 700 in order to keep the portable electronic device 700 running. As general understanding, the power source may be a built-in battery, for example, a common lithium-ion battery, or a nickel-hydrogen battery, or may include an external power source, for example, an alternating current (AC) adapter, that directly supplies power to the portable electronic device 700. In some implementation manners of the present disclosure, the power source may also have broader definitions, for example, may also include a power management system, a charging system, a power failure detection circuit, a power converter or inverter, a power status indicator (such as a light emitting diode), and any other component related to generation, management, and distribution of electric energy for the portable electronic device 700.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A call forwarding method, comprising:
   determining, by a terminal, whether a phone number is in a preset blacklist when the terminal receives a call carrying the phone number; and
   executing, by the terminal when the preset blacklist comprises the phone number and a call forwarding on busy service is enabled, a first preset call forwarding policy comprising:
   sending, by the terminal to a server, an instruction to disable a call forwarding on busy service;
   subsequent to sending the instruction to disable the call forwarding on busy service, sending, by the terminal to the server, a hang-up instruction to terminate the call; and
   subsequent to sending the hang-up instruction, sending, by the terminal to the server, an instruction to enable the call forwarding on busy service.

2. The call forwarding method of claim 1, wherein the instruction to disable the call forwarding on busy service comprises a first unstructured supplementary service data (USSD) instruction, and the instruction to enable the call forwarding on busy service comprises the first USSD instruction.

3. The call forwarding method of claim 2, further comprising:
   receiving, through a user interface, a second USSD instruction to implement an unconditional call forwarding service corresponding to unconditionally forwarding calls;
   in response to receiving the second USSD instruction, disabling the unconditional call forwarding service for the call prior to receiving the call by sending the server a third USSD instruction corresponding to a call forwarding on no answer service; and
   executing, by the terminal when the preset blacklist comprises the phone number and the call forwarding on no answer service is enabled, a second preset call forwarding policy comprising sending, by the terminal to the server, the hang-up instruction to terminate the call.

4. The call forwarding method of claim 1, further comprising:
   receiving, through a user interface, an instruction to implement an unconditional call forwarding service corresponding to unconditionally forwarding calls;
   in response to receiving the instruction to implement the unconditional call forwarding service, disabling the unconditional call forwarding service for the call prior to receiving the call by sending the server an instruction to implement a call forwarding on no answer service; and
   executing, by the terminal when the preset blacklist comprises the phone number and the call forwarding on no answer service is enabled, a second preset call forwarding policy comprising sending, by the terminal to the server, the hang-up instruction to terminate the call.

5. A terminal device, comprising:
   a display comprising a touch-sensitive surface and a display screen;
   a processor coupled to the display; and
   a memory coupled to the processor and configured to store instructions that, when executed by the processor, cause the processor to:
   determine whether a phone number is in a preset blacklist when a call carrying the phone number is received at the terminal device; and
   when the preset blacklist comprises the phone number, execute a preset call forwarding policy comprising preventing a server from forwarding the call to a preset another device by sending the server one or more instructions including a hang-up instruction to cause the server to terminate the call, wherein when the preset call forwarding policy is a call forwarding on busy service, the one or more instructions sent to the server further include an instruction to disable a call forwarding on busy service, and wherein the instructions further cause the processor to send the instruction to disable the call forwarding service before sending the hang-up instruction.

6. The terminal device of claim 5, wherein the instructions further cause the processor to:
   receive, through a user interface, user selection of an unconditional call forwarding service as the preset call forwarding policy; and
   disable the unconditional call forwarding service for the call by sending, in response to the user selection of the unconditional call forwarding service as the preset call forwarding policy, an instruction to enable a target call forwarding service to send the hang-up instruction to the server when the preset blacklist comprises the phone number.

7. A non-transitory computer readable storage medium configured to store one or more programs comprising instructions that, when executed by a processor, cause a terminal device to be configured to:
   determine whether a phone number is in a preset blacklist when a call carrying the phone number is received; and
   when the preset blacklist comprises the phone number, execute a preset call forwarding policy comprising preventing a server from forwarding the call to a preset another device by sending the server one or more instructions including a hang-up instruction to cause the server to terminate the call, wherein when the preset call forwarding policy is a call forwarding on busy service, the one or more instructions sent to the server further include an instruction to disable a call forwarding on busy service, and wherein the instructions further cause the processor to send the instruction to disable the call forwarding service before sending the hang-up instruction.

8. The non-transitory computer readable storage medium of claim 7, wherein the instructions further cause the terminal device to be configured to:
   receive, through a user interface, user selection of an unconditional call forwarding service as the preset call forwarding policy; and
   disable the unconditional call forwarding service for the call by sending, in response to the user selection of the unconditional call forwarding service as the preset call forwarding policy, an instruction operable to enable a target call forwarding service to send the hang-up instruction to the server when the preset blacklist comprises the phone number.

* * * * *